United States Patent
Fox et al.

(10) Patent No.: US 7,877,094 B2
(45) Date of Patent: Jan. 25, 2011

(54) LOCATION UPDATING IN COMMUNICATIONS NETWORKS

(75) Inventors: David Andrew Fox, Reading (GB); Gavin Wong, Surrey (GB); Christopher David Pudney, Newbury (GB)

(73) Assignee: Vodafone Group PLC, Newbury (GB)

( * ) Notice: Subject to any disclaimer, the term of this patent is extended or adjusted under 35 U.S.C. 154(b) by 525 days.

(21) Appl. No.: 11/180,171

(22) Filed: Jul. 13, 2005

(65) Prior Publication Data

US 2006/0058020 A1  Mar. 16, 2006

(30) Foreign Application Priority Data

Jul. 14, 2004  (GB) ................. 0415762.4

(51) Int. Cl.
*H04W 36/00* (2009.01)
*H04W 40/00* (2009.01)

(52) U.S. Cl. ............. 455/438; 455/436; 455/439; 455/448

(58) Field of Classification Search ............. 455/456.1, 455/426.1, 41.2, 456.5, 436, 448, 552.1, 455/438, 439
See application file for complete search history.

(56) References Cited

U.S. PATENT DOCUMENTS

| | | | |
|---|---|---|---|
| 6,304,913 B1 | 10/2001 | Rune | |
| 6,741,693 B1 | 5/2004 | Madoch et al. | |
| 7,200,112 B2 * | 4/2007 | Sundar et al. | 370/230 |
| 2002/0147008 A1 * | 10/2002 | Kallio | 455/426 |
| 2003/0050076 A1 | 3/2003 | Watanabe | |
| 2003/0065762 A1 | 4/2003 | Stolorz et al. | |
| 2003/0216140 A1 * | 11/2003 | Chambert | 455/426.1 |
| 2004/0058692 A1 | 3/2004 | Kall et al. | |
| 2004/0203873 A1 * | 10/2004 | Gray | 455/456.1 |

FOREIGN PATENT DOCUMENTS

| | | |
|---|---|---|
| EP | 1 207 708 A1 | 5/2002 |
| EP | 1 301 052 A3 | 4/2003 |
| GB | 2 367 213 A | 3/2002 |
| GB | 2376 845 A | 12/2002 |
| GB | 2 387 069 A | 10/2003 |
| WO | WO 03/032618 A1 | 4/2003 |
| WO | WO 03/032656 A1 | 4/2003 |
| WO | WO 03/096628 A1 | 11/2003 |
| WO | WO 03/098959 A1 | 11/2003 |
| WO | WO 04/002051 A3 | 12/2003 |
| WO | WO 2004/036770 A2 | 4/2004 |

* cited by examiner

*Primary Examiner*—Un C Cho
(74) *Attorney, Agent, or Firm*—Workman Nydegger

(57) ABSTRACT

This disclosure concerns systems and methods for location updating in communications networks. In one example, when a device initiates a connection to an access network, by way of which a communications network is adapted to provide core network GSM functions to devices registered therewith over a non-GSM bearer, a core network interrogates the device to obtain, if available, data indicative of the cell occupied thereby, interrogates the core network to obtain, if available, an indicator of the identity of the cell occupied by the device, obtains, if available, data indicative of the location of the access point with which the device communicates, and, in dependence on that location, selects an access controller for communicating with the access point or instructs the device to attempt to connect to the GSM radio access network.

41 Claims, 3 Drawing Sheets

US 7,877,094 B2

LOCATION UPDATING IN COMMUNICATIONS NETWORKS

CROSS-REFERENCE TO RELATED APPLICATIONS

This Application claims the benefit of United Kingdom Patent Application No: GB 0415762.4 entitled LOCATION UPDATING IN COMMUNICATIONS NETWORKS, filed Jul. 14, 2004, which is incorporated herein in its entirety by this reference.

BACKGROUND OF THE INVENTION

The Field of the Invention

The present invention relates to location up-dating in communications networks.

BRIEF SUMMARY OF EXEMPLARY EMBODIMENTS OF THE INVENTION

According to a first aspect of the invention, there is provided a GSM or the like cellular telecommunications network including a radio access network and a core network for providing GSM or the like functions to devices registered therewith over a GSM or the like bearer; wherein the radio access network comprises a plurality of geographically distributed cells, the devices are arranged to store data indicative of the cell occupied thereby, and the core network is arranged to store an indicator of the identity of the cell or location area occupied by each device, the cellular telecommunications network being adapted to provide core network GSM or the like functions to devices registered therewith over a non-GSM bearer via another access network including a plurality of access points, groups of which communicate with respective nodes for exchanging data with the core, and including means, operable when a device initiates a connection to the other access network, for: receiving, if available, said data indicative of the cell occupied by a said device; obtaining, if available, said indicator of the identity of the cell or location area last occupied by the device; obtaining, if available, data indicative of the location of the access point with which the device communicates; and, in dependence thereon, selecting one of said nodes for communicating with the access point or instructs the device to attempt to connect to the radio access network.

According to a second aspect of the invention, there is provided a method of operating a GSM or the like cellular telecommunications network including a radio access network and a core network for providing GSM or the like functions to devices registered therewith over a GSM or the like bearer; wherein the radio access network comprises a plurality of geographically distributed cells, the devices are arranged to store data indicative of the cell occupied thereby, and the core network is arranged to store an indicator of the identity of the cell or location area occupied by each device, the network being adapted to provide core network GSM or the like functions to devices registered therewith over a non-GSM bearer via another access network including a plurality of access points, groups of which communicate with respective nodes for exchanging data with the core; the method including, when a device initiates a connection to the other access network, receiving from the device, if available, said data indicative of the cell occupied thereby, obtaining, if available, said indicator of the identity of the cell or location area occupied by the device, obtaining, if available, data indicative of the location of the access point with which the device communicates, and, in dependence thereon, selecting one of said nodes for communicating with the access point or instructing the device to attempt to connect to the radio access network.

These and other aspects of exemplary embodiments of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
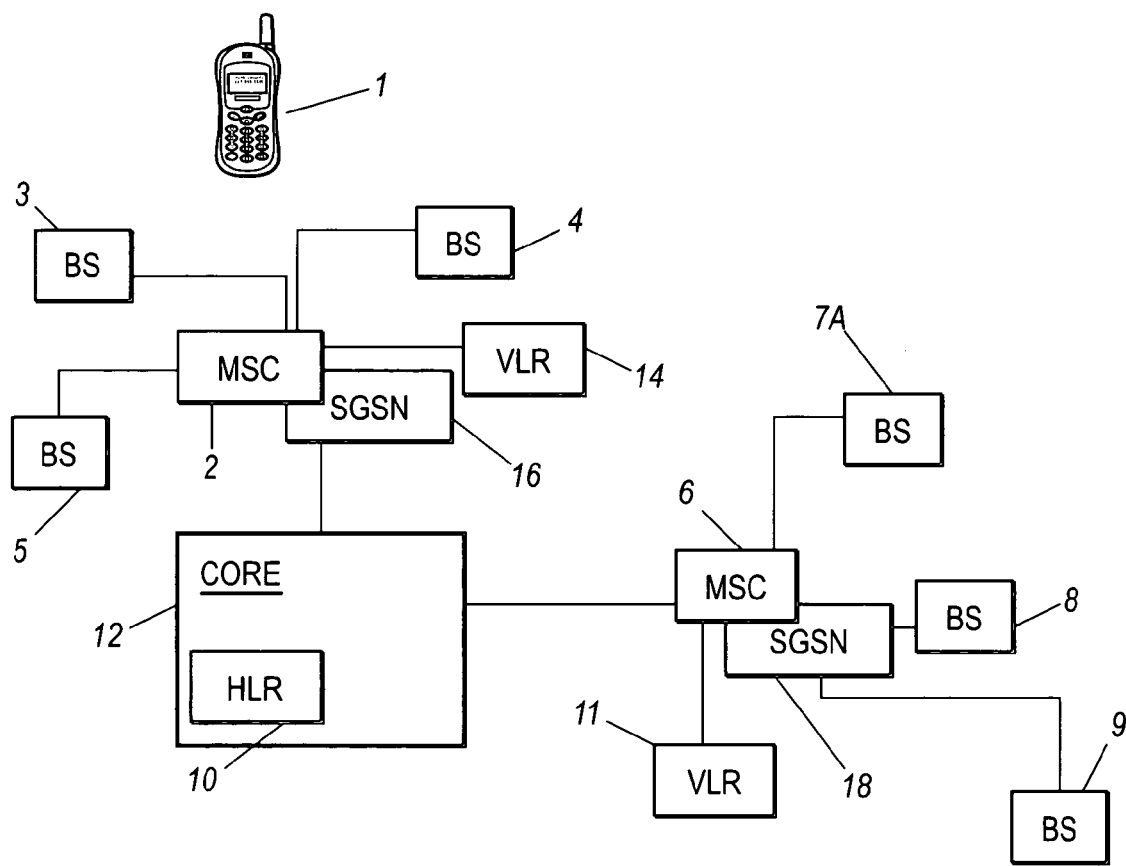
FIG. 1 is a diagrammatic drawing of elements of a GSM mobile telephone network for use in explaining the operation of such a network.

Various elements of a mobile telecommunications network, and its operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal is shown at 1. Each base station comprises a base transceiver station (BTS) and a base station controller (BSC). A BSC may control more than one BTS. The BTSs and BSCs comprise the radio access network.

The base stations are arranged in groups and each group of base stations is controlled by a mobile switching centre (MSC), such as MSC 2 for base stations 3,4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known location of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. The base station 3 then transmits this IMSI to the MSC 2 with which the BS 3 is registered.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and is then routed to the called party via the MSC 2. By means of the information held in the VLR 14, MSC 2 can associate the call with a particular subscriber and thus record information for charging purposes.

The MSCs 2 and 6 support communications in the circuit switched domain—typically voice calls. Corresponding serving gateway support nodes (SGSNs) 16 and 18 are provided to support communications in the packet switched domain—such as GPRS data transmissions.

GSM offers multiple "services" to end users. In the GSM Specifications, services are grouped in 3 categories.

1. Bearer Services: A bearer service is used for transporting user data. Examples of bearer services are:
   Asynchronous and synchronous data, 300-9600 bps.
   Alternate speech and data, 300-9600 bps.
   Asynchronous PAD (packet-switched, packet assembler/ disassembler) access, 300-9600 bps.
   Synchronous dedicated packet data access, 2400-9600 bps.

2. Tele-Services: These include both speech and data services. Examples of tele-services are:
   Telephony.
   Facsimile group 3.
   Emergency calls.
   Teletex.
   Short Message Services.
   Fax mail.
   Voice mail.

3. Supplementary Services: These are offered as improvements to the above tele-services. They enable the user to have better control of the basic services. Examples of supplementary services are:
   Call Forwarding.
   Call Barring.
   Call hold. Puts an active call on hold.
   Call Waiting.
   Advice of Charge.
   Multiparty service.
   Calling Line Identification.

The foregoing is intended to be merely a simplified description of the normal operation of the GSM network. In practice, other procedures will be carried out.

There have recently been proposals to allow access to the aspects and services provided by GSM networks other than by accessing those networks in the conventional manner by wireless signaling between the mobile terminal and the base station providing coverage in the cell occupied by the mobile terminal using GSM communication protocols. It has been proposed to provide network access points (APs), for example at a subscriber's home. A modified GSM terminal is provided with the facility to additionally communicate with the access point by any suitable technology, for example by a Bluetooth (RTM) connection. A protocol for communication between such a mobile terminal and an access point has been developed and is called "unlicensed mobile access" (UMA), and allows GSM aspects to function using non-GSM bearer technologies.

Figure 2:
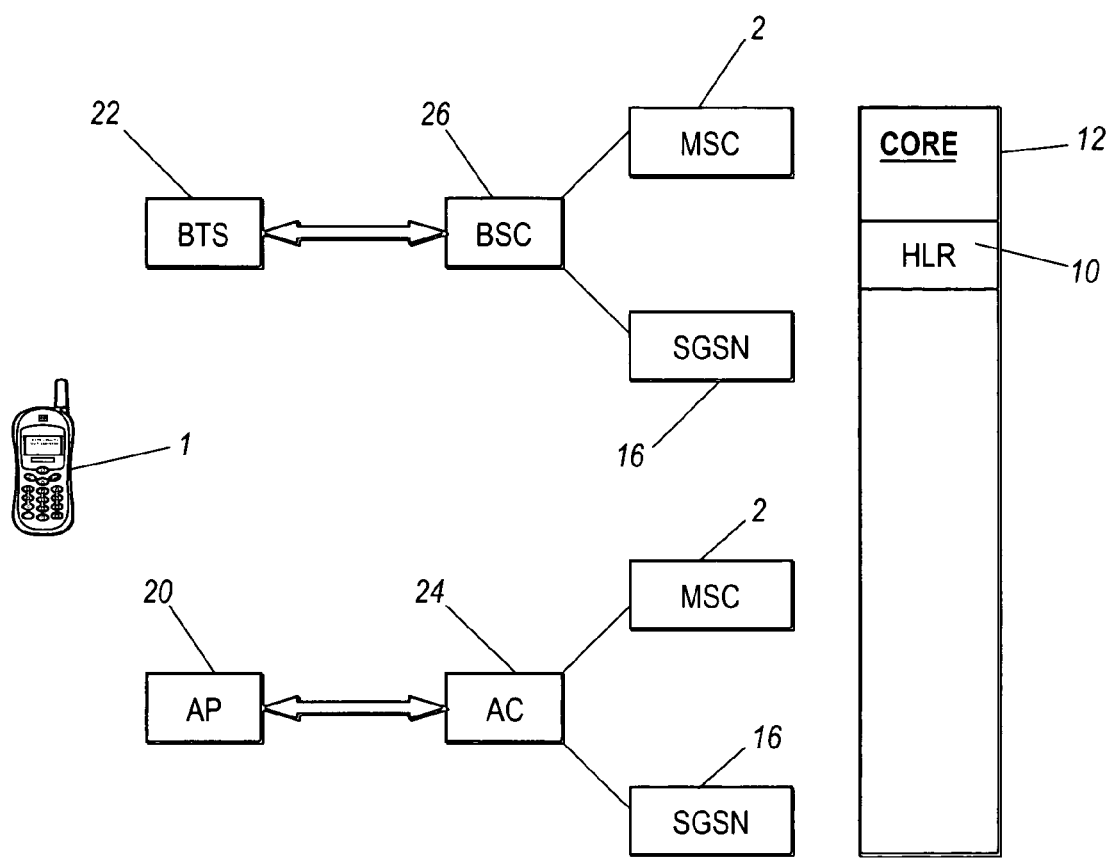
FIG. 2 shows a modified GSM mobile telephone network for receiving IP-based communications from a non-GSM access point.

FIG. 2 shows elements for providing access to a GSM network by both a conventional GSM bearer and a non-GSM bearer. As indicated above, an AP 20 provides a radio link to mobile terminal 1, although a link by a cable or other means such as an infra-red is also possible. The AP 20 performs a role corresponding to that of a GSM base station transceiver (BTS) 22.

An access controller (AC) 24 is provided which performs a function analogous to that of a GSM BSC 26. Communications between the access point 20 and the access controller 24 are IP based communications, and may be, for example, transmitted over a broadband IP network (and routed via the Internet). The access controller converts the IP based signaling received from the access point to use protocols used for signaling in conventional GSM networks between the base station controller 26 and MSC 2/SGSN 16.

When the mobile terminal 1 connects to the AP 20, it will be provided with an IP address for use during the communication session, and the AP 20 will inform the mobile terminal of its own IP address. The IP address provided by the AP 20 will have a corresponding domain name—such as "Vodafone.co.uk". A domain name server (DNS) maintains a database of IP addresses and the corresponding domain names. The domain names may comply with the X.500 standard or may have any other suitable format.

At this point it should be appreciated that mobile telecommunications networks, with their geographically distributed BTSs, BSCs, MSCs and SGSNs, have been developed to allow subscribers to make and receive calls at any point, and whilst moving around, within the network coverage area. The complex location signaling between the mobile terminal and the components of the network is provided to enable this operation throughout the coverage area of the network. The considerations for fixed IP based communications are very different. Data received from the mobile terminal at the access point 20 is transmitted via any IP network (such as the Internet). Only a single access controller 24 is required to receive IP based communications from all access points 20. For example, a single access controller may be provided for communications in one country.

As indicated above, the functions of the BSC 26 and access controller 24 are analogous: both components translate communications into a format suitable for transmission to an MSC/SGSN. However, each BSC 26 is associated with particular MSC(s) 2 and SGSN(s) 16 (and is located within a particular location area). In contrast, there is no particular predetermined relationship between the access controller 24 and any particular MSC/SGSN.

It is desirable for the mobile telecommunications network to be able to determine the location of a mobile terminal that is communicating therewith via the conventional BTS 22/BSC 26 route, or via the AP 20/AC 24 route.

According to one aspect of the present invention, communications from a particular access point/mobile station are allocated to a selected access controller 24. The access controller 24 is selected in dependence on the determined location of the mobile terminal. The selected access controller will in turn select an appropriate MSC/SGSN in order to communicate with the network core 12. For example, the selected access controller 24 will be the access controller nearest the mobile terminal. However, the access controller 24 does not have to be physically close to the mobile terminal, but the access controller 24 should be allocated such that it allows for seamless handover towards the cellular network—e.g. by being served by the same MSC/SGSN and the BSC. The physical distance between the mobile terminal and access controller 24 does not matter. However, it is preferable to have the access controller 24 in the same country at least as the cellular network that the mobile terminal might access. This ensures the continuity in roaming revenue for both the visited network and the home network. Otherwise, if the access controller 24 and core were in the home country of the subscriber, and the subscriber travels abroad, the visited country would have no knowledge that the subscriber is there and will not earn any roaming revenue. Also, the home operator would not receive any international charge revenue if subscriber wanted to call someone in the home country. Finally, without well defined access controller 24 selection a mobile could attach to a access controller 24 in the country that the subscriber wanted to call and get "cheaper" local call rates rather than making international calls (at appropriate higher rates) from where he/she actually is.

When a mobile terminal registers with the GSM network, the BSC 26 passes to the MSC 2 the Cell Global Identity (CGI) of the cell used by the mobile terminal in the GSM network. The current CGI of the by the mobile terminal is stored by the network core 12. The CGI is a concatenation of the location area (24) identity and the cell identity and uniquely identifies a given cell. The mobile terminal may also store the CGI on its SIM.

When a mobile terminal is activated in an area served by access point 20, a link is established, such as a Bluetooth (RTM) link or a WLAN link. It is envisaged that some access points 20 will be configured to provide authentication of mobile terminals with the network core 12. However, some access points 20 may not have this functionality.

According to a aspect of the present invention, an arrangement is provided for determining the (at least approximate) location of a mobile terminal when connected to an access point. This is advantageous because the mobile telecommunications network may wish to apply differential charging depending upon the location of the mobile terminal. For example, if the mobile terminal connects to an access point located in a different country to the "home" country of the mobile terminal (typically the country in which the mobile telecommunications network operator with which the user of the mobile terminal 1 is directly subscribed is located). It is also advantageous to know the location of the mobile terminal so that, when the mobile terminal reverts to communicating using the GSM bearer, the GSM network can authenticate the terminal and provide service rapidly. For example, when a mobile terminal is located in the coverage area of a visited network, if this is known to the subscribers "home" network, appropriate subscriber data can be passed to the visited network in advance of the subscriber attempting to obtain service (by a "roaming" agreement) using the GSM bearer. GSM service via the roamed network will then be available seamlessly.

Figure 3:
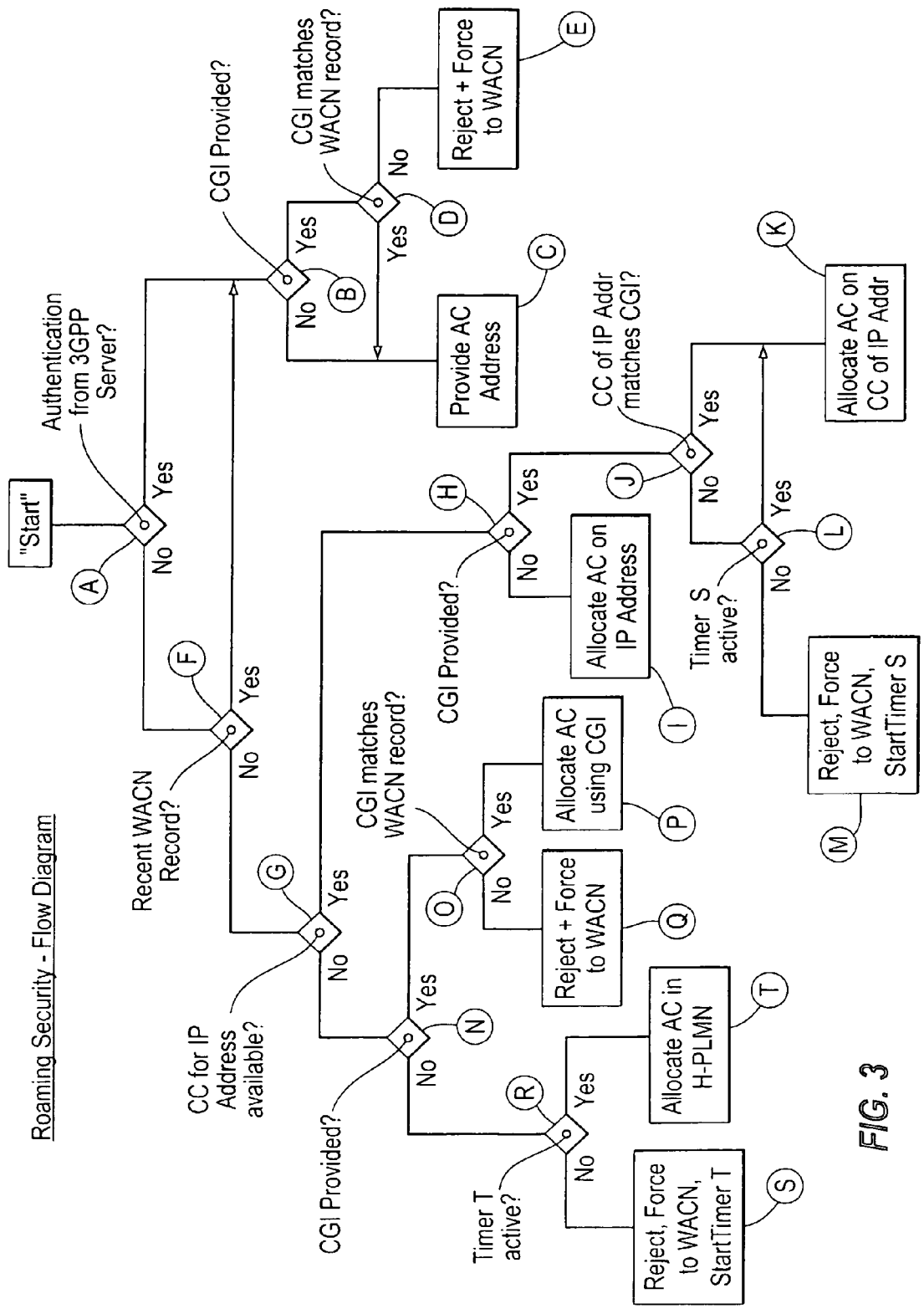
FIG. 3 shows a flow chart, illustrating the steps performed to determine the location of an access point.

The flow chart of FIG. 3 shows the steps that are performed when a mobile terminal is activated in the coverage area of an access point 20. When a connection between the mobile terminal and the access point 20 is established (for example by WLAN connection), EP based data communications between the mobile terminal 1 and the access controller 24 then occur.

At step A it is determined whether the access point 20 has performed authentication of the mobile terminal 1 by the challenge and response exchange, described earlier, with the core 12. The core 12 receives (if available) from the mobile terminal 1 a record (for example, the CGI) of the last cell occupied by the mobile terminal (if available). Assuming that authentication is possible, at step B it is determined whether the last CGI is provided by the mobile terminal. If no CGI is available, the core 12 indicates to the access controller 24 that the appropriate serving access controller for the mobile terminal should be determined based on the location information provided by the network core (step C). If the appropriate access controller is determined to be different from the access controller through which the mobile terminal and access point have been communicating thus far, the access controller is then changed to the appropriate access controller for the location of the mobile terminal.

If a CGI is provided by the mobile terminal, this is compared with the (network core 12 operator dependent) location information previously stored in the network core 12 (step D). If the CGI matches the location information in the network core 12, the network core indicates to the access controller 24 that access controller allocation should be based on the CGI provided by the mobile terminal (step C). However, if the CGI provided by the mobile terminal and the location information stored in the network do not match, this indicates that there has been some irregularity in the behavior of the mobile terminal, or that the information held by the network on the location of the mobile terminal is out of date.

At step E the access controller rejects the attempts of the mobile terminal to communicate via the non-GSM bearer, and signals to the mobile terminal to cause the mobile terminal to register with the mobile telecommunications network core 12 using the GSM bearer, via the local BTS 22 and BSC 26. This will allow the location information held by the network in relation to the mobile terminal 1 to be updated using known GSM mobile terminal locating techniques.

If at step A it is determined that the access point 20 did not authenticate the mobile terminal 1 with the core 12 of the mobile telecommunications network it is then determined whether a recent record from the mobile telecommunications network of the location of the mobile terminal is available (step F). If recent (network core 12 operator dependent) location information is available, the flow passes to step B, at which step it is determined whether a CGI was provided by the mobile terminal, and subsequent steps C, D and/or E are performed as described above.

However, if it is determined at step F that no or no recent location information is available from the mobile telecommunications network, the IP address of the mobile terminal, allocated by the access point 20, is analyzed. The IP address is passed to the domain name server (DNS), which performs a reverse-DNS function and obtains the domain name (such as "Vodafone.co.uk") from the IP address. Some domain names do provide an indication of the country or region to which the corresponding IP address relates. For example, "Vodafone.co.uk" indicates that the access point 20 is located in the United Kingdom. The domain name "Vodafone.de" indicates that the access point with an IP address corresponding to that domain name is located in Germany. However, some domain names such as "Vodafone.com" do not provide any reliable indication of the location of the access point having an IP address corresponding to that domain name. At step G it is determined whether the location information is derivable from the IP address. If such location information is derivable it is determined at step H whether a CGI was provided by the mobile terminal 1. If no CGI was provided, the network core 12 indicates that an access controller should be allocated to communicate with the access point based on the location information derived from the IP address of the mobile terminal 1(step I).

However, if the CGI was provided by the mobile terminal 1, it is determined at step J whether the CGI information is consistent with the location information derived from the IP address of the mobile terminal 1. If there is consistency, the network core 12 indicates that an access controller should be allocated based on the location information derivable from the IP address of the mobile terminal 1 (step K).

However, if the location information derivable from the EP address of the access point 20 is not consistent with the CGI, it is determined at step L whether a timer S is active. If the timer S is not active the mobile terminal is forced to attempt to access the core network 12 via the GSM bearer, using BTS 20 and BSC 26 in order that the location information relating to the mobile terminal can be updated in the mobile terminal and also in the network core 12 using standard GSM registration techniques (step M). When, at step M, the instruction is given by the network core 12, for the mobile terminal to access the network core 12 using the GSM bearer, the timer S is started.

The determination of the status of the timer S and the activation of the timer S at steps L and M is provided so that, in the event that services not available using the GSM bearer (for example, because there is not GSM radio coverage in the area), service via the access point 20 can be provided to the mobile terminal 1. The flow may return to the "Start" point of the flow chart after attempting GSM registration. If the results of the decisions at steps A, F, G, H and J are the same as described immediately above, at step L, once it is determined that the timer S is active, the flow will then pass to step K, where the access controller is allocated in dependence upon the location information derivable from the IP address of the mobile terminal 1.

If at step G it is determined that no location information is derivable from the IP address of the mobile terminal 1, it is determined at step N whether a CGI was provided by the mobile terminal 1. If a CGI was provided, it is determined whether the provided CGI matches the (network core 12 operator dependent) location information stored in the mobile telecommunications network (even though this may not be recent). If these values are consistent, the network core 12 instructs the access controller to allocate an access controller based on the CGI provided by the mobile terminal 1 (step P). However, if the values are inconsistent, the network core 12 indicates to the access controller that the terminal should be forced to obtain service using the GSM bearer, via BTS 22 and BSC 26 (step Q).

If it is determined at step N that no CGI was provided by the mobile terminal 1, it is then determined whether a timer T is active at step R. If the timer T is not active the network core 12 indicates to the access controller 24 that the mobile terminal 1 should be instructed to obtain service using the GSM bearer, and the timer T is activated (step S). Flow may then return to the "Start". If the same decisions at steps A, F, G and N are made as described immediately above, at step R it is determined whether the timer T is active. If it is determined that the timer T is active, the network core 12 indicates to the access controller 24 that a new access controller should be selected based on the location of the subscriber's home network (step T).

In a similar manner to timer S, timer T allows a mobile terminal to obtain service via an access point and a non-GSM bearer in the event that service from a GSM bearer is not available.

In the description above, the network core 12 controls the process for selecting an appropriate serving controller. It should be appreciated that the initially used access controller may control some of these functions.

The term "GSM" used in this specification should be interpreted broadly. The invention is applicable to other telecommunications networks that are similar to GSM networks (in that they have equivalent nodes with equivalent functionality)—such as UMTS (3G), AMPS, D-AMPS, DCS 1800, 15-41, 15-54, 15-95, PCS, CDMA, TDMA networks. The invention is also applicable to developments or extensions to GSM—such as GPRS.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cellular telecommunications network, comprising:
    a radio access network comprising a plurality of geographically distributed cells;
    a core network for providing cellular telecommunications network functions to devices registered therewith over a cellular telecommunications network bearer, the cellular telecommunications network being adapted to provide core network cellular telecommunications network functions to the devices over a non-cellular telecommunications network bearer via an other access network including a plurality of access points, groups of which communicate with respective access controllers for exchanging data with the core network, each device being arranged to store a first location identifier that includes data indicative of the cell occupied thereby, and the core network being arranged to store a second location identifier that includes an indicator of the identity of the cell or location area occupied by each device; and a network core, operable when one of the devices initiates a connection to the other access network, the network core being configured to perform the following method:
   determining whether said first and second location identifiers, and a third location identifier that includes data indicative of the location of the access point with which the device communicates are available;
   receiving, if available, said first location identifier;
   obtaining, if available, said second location identifier;
   obtaining, if available, said third location identifier; and
   in dependence on at least one of the three location identifiers, determining whether to continue using the selected access controller for communicating, to select another one of said access controllers for communicating with the access point, or to instruct the device to attempt to connect to the radio access network.

2. The cellular telecommunications network of claim 1, wherein
   the radio access network comprises a first plurality of base stations, each of which serves one of said cells, and
   the core network comprises a plurality of switching centers, each of said switching centers controlling a second plurality of base stations, each of which serves one of said cells.

3. The cellular telecommunications network of claim 2, wherein said switching centers comprise GSM Mobile Switching Centers.

4. The cellular telecommunications network of claim 2, wherein said switching centers comprise GSM Serving Gateway Support Nodes.

5. The cellular telecommunications network of claim 2, wherein said selected access controller communicates with one of said switching centers.

6. The cellular telecommunications network of claim 5, wherein said selected access controller selects said one of said switching centers.

7. The cellular telecommunications network of claim 1, wherein the non-cellular telecommunications network bearer includes a wireless link between the device and the access point.

8. The cellular telecommunications network of claim 7, wherein said wireless link comprises one of: a Bluetooth link and a WLAN link.

9. The cellular telecommunications network of claim 7, wherein said wireless link comprises a link using unlicensed spectrum.

10. The cellular telecommunications network of claim 1, wherein said non-cellular telecommunications network bearer comprises an IP-based communications link.

11. The cellular telecommunications network of claim 10, wherein said IP-based communications link includes the Internet.

12. The cellular telecommunications network of claim 10, wherein the data indicative of the location of the access point is obtained by determining the domain name corresponding to the IP address of the device allocated by the access point.

13. The cellular telecommunications network of claim 12, wherein said domain name is obtained from a Domain Name Server.

14. The cellular telecommunications network of claim 1, wherein said selected access controller is selected in dependence on the proximity thereof to the device.

15. The cellular telecommunications network of claim 14, wherein said selected access controller is the access controller determined to be nearest to the device.

16. The cellular telecommunications network of claim 1, wherein at least two of:
   said data from said device indicative of the cell occupied thereby,
   said indicator from the core network indicative of the identity of the cell or location area occupied by said device, and
   said data indicative of the location of the access point with which said device communicates,
   are compared.

17. The cellular telecommunications network of claim 16, wherein, if said compared data are inconsistent, said device is instructed to attempt to connect to the radio access network.

18. The cellular telecommunications network of claim 16, wherein, if said compared data are consistent, said one of said access controllers is selected for communicating with the access point.

19. The cellular telecommunications network of claim 1, wherein the cellular telecommunications network is a GSM network.

20. The cellular telecommunications network of claim 1, wherein the cellular telecommunications network is a 3G (UMTS) network.

21. A method of operating a cellular telecommunications network that includes a radio access network and a core network for providing cellular telecommunications network functions to devices registered therewith over a cellular telecommunications network bearer, the radio access network including a plurality of geographically distributed cells, the devices being arranged to store a first location identifier that includes data indicative of the cell occupied thereby, the core network being arranged to store a second location identifier that includes an indicator of the identity of the cell or location area occupied by each device, and the cellular telecommunications network being adapted to provide core network cellular telecommunications network functions to the devices over a non-cellular telecommunications network bearer via an other access network including a plurality of access points, groups of which communicate with respective access controllers for exchanging data with the core network, the method being performed by the network core when one of the devices initiates a connection to the other access network, the method comprising:
   determining whether said first and second location identifiers, and a third location identifier that includes data indicative of the location of the access point with which the device communicates are available;
   receiving from the device, if available, said first location identifier;
   obtaining, if available, said second location identifier;
   obtaining, if available, said third location identifier; and
   in dependence on at least one of the three location identifiers, determining whether to continue using the selected access controller for communicating, to select another one of said access controllers for communicating with the access point, or to instruct the device to attempt to connect to the radio access network.

22. The method of claim 21, wherein
   the radio access network comprises a first plurality of base stations, each of which serves one of said cells, and
   the core network comprises a plurality of switching centers, each of said switching centers controlling a second plurality of base stations, each of which serves one of said cells.

23. The method of claim 22, wherein said switching centers comprise GSM Mobile Switching Centers.

24. The method of claim 22, wherein said switching centers comprise GSM Serving Gateway Support Nodes.

25. The method of claim 22, wherein said selected access controller communicates with one of said switching centers.

26. The method of claim 25, wherein said selected access controller selects said one of said switching centers.

27. The method of claim 21, wherein the non-cellular telecommunications network bearer includes a wireless link between the device and the access point.

28. The method of claim 27, wherein said wireless link comprises one of: a Bluetooth link and a WLAN link.

29. The method of claim 27, wherein said wireless link comprises a link based on unlicensed spectrum.

30. The method of claim 21, wherein said non-cellular telecommunications network bearer comprises an IP-based communications link.

31. The method of claim 30, wherein said IP-based communications link includes the Internet.

32. The method of claim 30, wherein the data indicative of the location of the access point is obtained by determining the domain name corresponding to the IP address of the access point.

33. The method of claim 32, wherein said domain name is obtained from a Domain Name Server.

34. The method of claim 1, wherein said selected access controller is selected in dependence on the proximity thereof to the device.

35. The method of claim 34, wherein said selected access controller is the access controller determined to be nearest to the device.

36. The method of claim 21, wherein at least two of:
said data from said device indicative of the cell occupied thereby,
said indicator from the core network indicative of the identity of the cell or location area occupied by said device, and
said data indicative of the location of the access point with which said device communicates,
are compared.

37. The method of claim 36, wherein, if said compared data are inconsistent, said device is instructed to attempt to connect to the radio access network.

38. The method of claim 37, including determining if said attempt to connect to the radio access network is unsuccessful and, in dependence upon that determination, enabling communication via said other access network.

39. The method of claim 36, wherein, if said compared data are consistent, said one of said access controllers is selected for communicating with the access point.

40. The method of claim 21, wherein the cellular telecommunications network is a GSM network.

41. The method of claim 21, wherein the cellular telecommunications network is a 3G (UMTS) network.

* * * * *